US011178464B2

(12) United States Patent
Vassigh et al.

(10) Patent No.: US 11,178,464 B2
(45) Date of Patent: Nov. 16, 2021

(54) AUDIO SEARCH RESULTS IN A MULTI-CONTENT SOURCE ENVIRONMENT

(71) Applicant: Roku, Inc., Los Gatos, CA (US)

(72) Inventors: Ali Vassigh, San Jose, CA (US); Saket Goel, Los Gatos, CA (US); Dave Law, Los Gatos, CA (US); Changchang Liu, Los Gatos, CA (US); Eunsun Mota, Los Gatos, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 16/686,966

(22) Filed: Nov. 18, 2019

(65) Prior Publication Data

US 2020/0196021 A1   Jun. 18, 2020

Related U.S. Application Data

(60) Provisional application No. 62/779,698, filed on Dec. 14, 2018.

(51) Int. Cl.
| | |
|---|---|
| *H04N 21/482* | (2011.01) |
| *H04N 21/422* | (2011.01) |
| *H04N 21/45* | (2011.01) |
| *G10L 15/08* | (2006.01) |
| *H04N 21/442* | (2011.01) |

(52) U.S. Cl.
CPC ......... *H04N 21/4828* (2013.01); *G10L 15/08* (2013.01); *H04N 21/42203* (2013.01); *H04N 21/44222* (2013.01); *H04N 21/4532* (2013.01); *G10L 2015/088* (2013.01)

(58) Field of Classification Search
CPC ......... H04N 21/4828; H04N 21/42203; H04N 21/4532; H04N 21/44222; H04N 21/4667; H04N 21/4622; H04N 21/4394; G10L 15/08; G10L 2015/088; G10L 2015/227; G10L 2015/223; G10L 15/22
See application file for complete search history.

(56) References Cited

U.S. PATENT DOCUMENTS

| | | | |
|---|---|---|---|
| 9,208,225 B1 * | 12/2015 | Sharifi | ........ G06F 17/30 |
| 2006/0075429 A1 * | 4/2006 | Istvan | ........ H04N 21/4828 |
| 2011/0289530 A1 * | 11/2011 | Dureau | ........ H04N 5/445 |

(Continued)

*Primary Examiner* — Anthony Bantamoi
(74) *Attorney, Agent, or Firm* — Sterne, Kessler, Goldstein & Fox P.L.L.C.

(57) ABSTRACT

Described herein are system, apparatus, article of manufacture, method and/or computer program product embodiments, and/or combinations and sub-combinations thereof, for processing voices searches over multiple content sources. Some embodiments operate by receiving audio input corresponding to a voice search from a user; performing automatic speech recognition of the audio input to obtain search parameters; executing a search having the search parameters over the multiple content sources to obtain search results; and displaying search results in categories in a manner customized to the user. The multiple content sources may include a principal content source, an active partner content source, and at least one non-active partner content source, where the active partner content source represents an active context. In some embodiments, the media device performs the receiving, performing, executing and displaying without exiting the active content.

18 Claims, 11 Drawing Sheets

(56) References Cited

U.S. PATENT DOCUMENTS

| | | | |
|---|---|---|---|
| 2013/0117259 A1* | 5/2013 | Ackerman | G06F 17/30 |
| 2014/0053209 A1* | 2/2014 | Young | H04N 21/472 |
| 2015/0066913 A1* | 3/2015 | Funk | G06F 17/3005 |
| 2018/0014075 A1* | 1/2018 | Lewis | H04N 21/482 |

* cited by examiner

AUDIO SEARCH RESULTS IN A MULTI-CONTENT SOURCE ENVIRONMENT

CROSS-REFERENCE TO RELATED APPLICATION

This application claims the benefit of U.S. Provisional Patent Application No. 62/779,698 titled "Audio Search Results In A Multi-Content Source Environment," filed Dec. 14, 2018, which is herein incorporated by reference in its entirety.

BACKGROUND

Field

This disclosure is generally directed to searching digital content in an environment that has multiple content sources.

Background

On demand access to content (such as movies, TV programs, news, music, games, live action sports, audio books, etc.) has become ubiquitous. A multitude of content sources exist, such as ROKU, HBO, NETFLIX, HULU, ESPN, CNN, ABC, NBC, CBS, YOUTUBE, SPOTIFY, PANDORA, SMULE, SLING, etc., to name just some examples, and these content sources individually and collectively offer to users an immense amount of content.

Search tools have been developed to help users find content of interest from these content sources. But to date, such search tools provide only limited value.

For example, most search tools are capable of performing only text searches, and they are limited to searching only a single content source. Other search tools permit searching over multiple content sources. However, often, the search results are displayed in a list format that is too busy to be useful.

Also, the user's context may not be preserved when searching multiple content sources. For example, assume the user is in HULU when she issues a search request. Often with existing search tools, the current context (that is, HULU) is exited when the search is performed and the search results displayed. Such change of context can be disruptive to the user experience.

Voice searches (that is, searches based on verbal commands spoken by users) are becoming more common. Usually, voice searches are treated just like text searches. As a result, audio searches suffer from the same limitations as just described above.

Also, typically each content source must develop its own engine for processing voice searches. This may be a technical challenge for some content sources. Also, having so many engines inevitably leads to different and inconsistent interfaces, which may detract from the user experience.

SUMMARY

Provided herein are system, apparatus, article of manufacture, method and/or computer program product embodiments, and/or combinations and sub-combinations thereof, for processing voices searches over multiple content sources.

Some embodiments operate by receiving audio input corresponding to a voice search from a user; performing automatic speech recognition of the audio input to obtain search parameters; executing a search having the search parameters over the multiple content sources to obtain search results; and displaying search results in categories in a manner customized to the user.

The multiple content sources may include a principal content source, an active partner content source, and at least one non-active partner content source, where the active partner content source represents an active context. In some embodiments, the media device performs the receiving, performing, executing and displaying without exiting the active content.

In some embodiments, the audio input is received by: receiving an indication that the user pressed a voice button on a remote control; and monitoring a microphone in the remote control to receive the audio input.

In some embodiments, the search results are displayed by: selecting first categories based on preferences and history of the user; generating new second categories based on the preferences and history of the user; ordering items in the first and second categories based on the preferences and history of the user; and ordering the first and second categories for display based on the preferences and history of the user.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for processing searches of digital content over multiple content sources. In some embodiments, the searches are voice searches (that is, searches based on audible verbal commands spoken by users), as opposed to text searches (that is, searches based on text provided by users, via a keyboard for example). The search results are organized into categories, and items within the categories are ordered in a manner customized to the user who initiated the search. Also, the categories themselves are ordered and displayed in a manner customized to the user. In this way, the search results are presented to the user in a manner that facilitates the user being able to locate content of interest.

Figure 5:
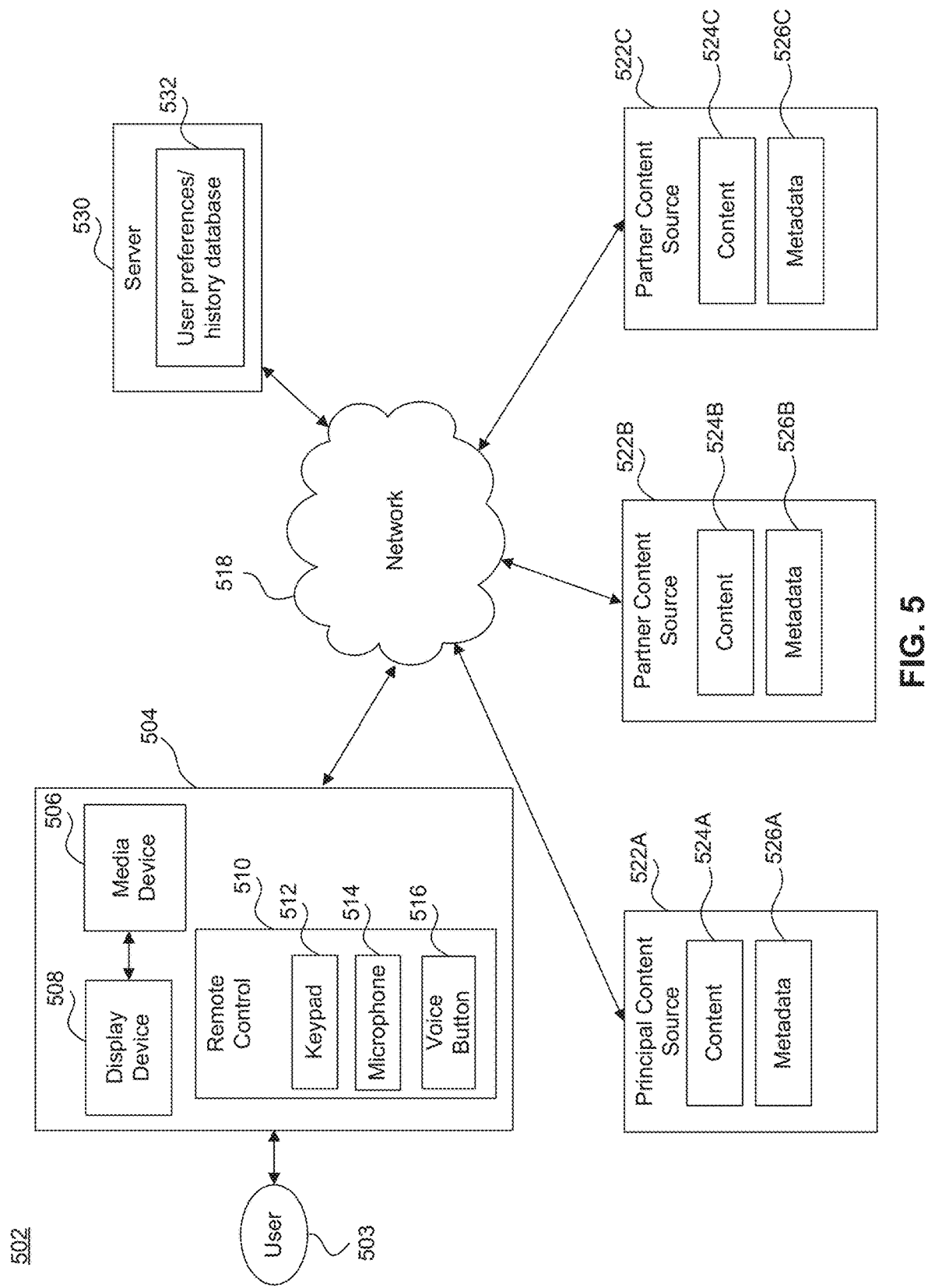
FIG. 5 illustrates a block diagram of a multimedia environment, according to some embodiments.

FIG. 5 illustrates a block diagram of a multimedia environment 502, according to some embodiments. In a non-limiting example, multimedia environment 502 is directed to playing content such as movies, TV shows, news, games, audio books, and music, to name just some examples.

The multimedia environment 502 may include a plurality of media systems 504. Each media system 504 may be used by one or more users 503. The media system 504 could be user 503's entertainment system, for example, and could be located in the user 503's home, workplace, vehicle, camp site, or any other location.

Each media system 504 may include one or more media devices 506 each coupled to one or more display devices 508. Media device 506 may be any combination of a streaming media device, over-the-air (OTA) content tuner, DVD/Blu-Ray device, audio/video playback device, cable box, satellite box, and/or digital video recording (DVR) device, to name just a few examples. Display device 508 may be a monitor, television, computer, smart phone, tablet, wearable (such as a watch), appliance, internet-of-things (IoT) device, and/or projector, to name just a few examples. In some embodiments, media device 506 can be a part of, integrated with, operatively coupled to, and/or connected to its respective display device 508.

Each media system 504 may include one or more remote controls 510. The user 503 can use the remote control 510 to control the media device 506 and/or display device 508. The remote control 510 can be a smart phone, tablet, wearable, digital assistant, or any other remote control, and can include voice responsive devices.

The remote control 510 may include a keypad 512 for receiving commands and text input from users 503. The remote control 510 may also include a microphone 514 for receiving audible or voice input spoken by users 503.

In some embodiments, the remote control 510 may include a voice button 516. By pressing the voice button 516, the user 503 may indicate to the remote control 510 that he wishes to speak a voice command, such as a voice search. Upon detecting that the voice button 516 has been pressed, the remote control 510 may listen for audible voice input by using the microphone 514.

The media device 506 may be configured to communicate with network 518. In various embodiments, the network 518 can include, without limitation, wired and/or wireless intranet, extranet, Internet, cellular, Bluetooth and/or any other short range, long range, local, regional, global communications network, as well as any combination thereof.

The multimedia environment 502 may include one or more content servers 522 (also called content providers or sources 522). Each content source 522 may be configured to communicate with network 518.

Each content source 522 may store content 524 and metadata 526. Content 524 may include any combination of music, videos, movies, TV programs, multimedia, images, still pictures, text, graphics, gaining applications, advertisements, programming content, public service content, government content, local community content, software, and/or any other content or data objects in electronic form.

Metadata 526 may represent data about content 524. For example, metadata 526 ay include associated or ancillary information indicating or related to writer, director, producer, composer, artist, actor, summary, chapters, production, history, year, trailers, alternate versions, related content, applications, and/or any other information pertaining or relating to the content 524. Metadata 526 may also or alternatively include links to any such information pertaining or relating to the content 524. Metadata 526 may also or alternatively include one or more indexes of content 524, such as but not limited to a trick mode index.

In some embodiments, one or more of the content sources 522A may be associated with a principal entity, and may be herein called principal content sources 522A. Other content sources 522B and 522C may be associated with partner entities, and may be herein called partner content sources 522B, 522C. It should be noted that, while FIG. 5 shows two partner content sources 522B, 522C, in practice the multimedia environment 502 may have any number of partner content sources 522B, 522C.

The principle content source 522A may provide content 524 from itself and/or partner content sources 522B, 522C to users 503 via media devices 506. Non-limiting examples of the principal content source 522A may include ROKU, APPLE TV, AMAZON FIRE TV, and GOOGLE CHROMECAST, to name just some examples. Non-limiting examples of partner content sources 522B, 522C may include HBO, NETFLIX, HULU, ESPN, CNN, ABC, NBC, CBS, SLING, AMAZON, SPOTIFY, PANDORA, SMULE and YOUTUBE, to name just some examples.

The multimedia environment 502 may include a server 530 that stores a user preferences/history database 532. The user preferences/history database 532 may include information regarding a given user 503's content viewing history and preferences, such as movies and TV programs the user 503 has watched, whether the user 503 watches news or sports, whether the user 503 watches action, drama or comedies, the actors the user watches the most, and whether and how often the user 503 streams music, audible books, computer games, etc. Other examples of user preferences and history will be apparent to persons skilled in the relevant art(s).

The user preferences/history database 532 may be populated by media devices 506 located throughout the world, as these media devices 506 monitor the actions of their respective users 503 while using the media device 506 to select and consume content 524.

Figure 6:
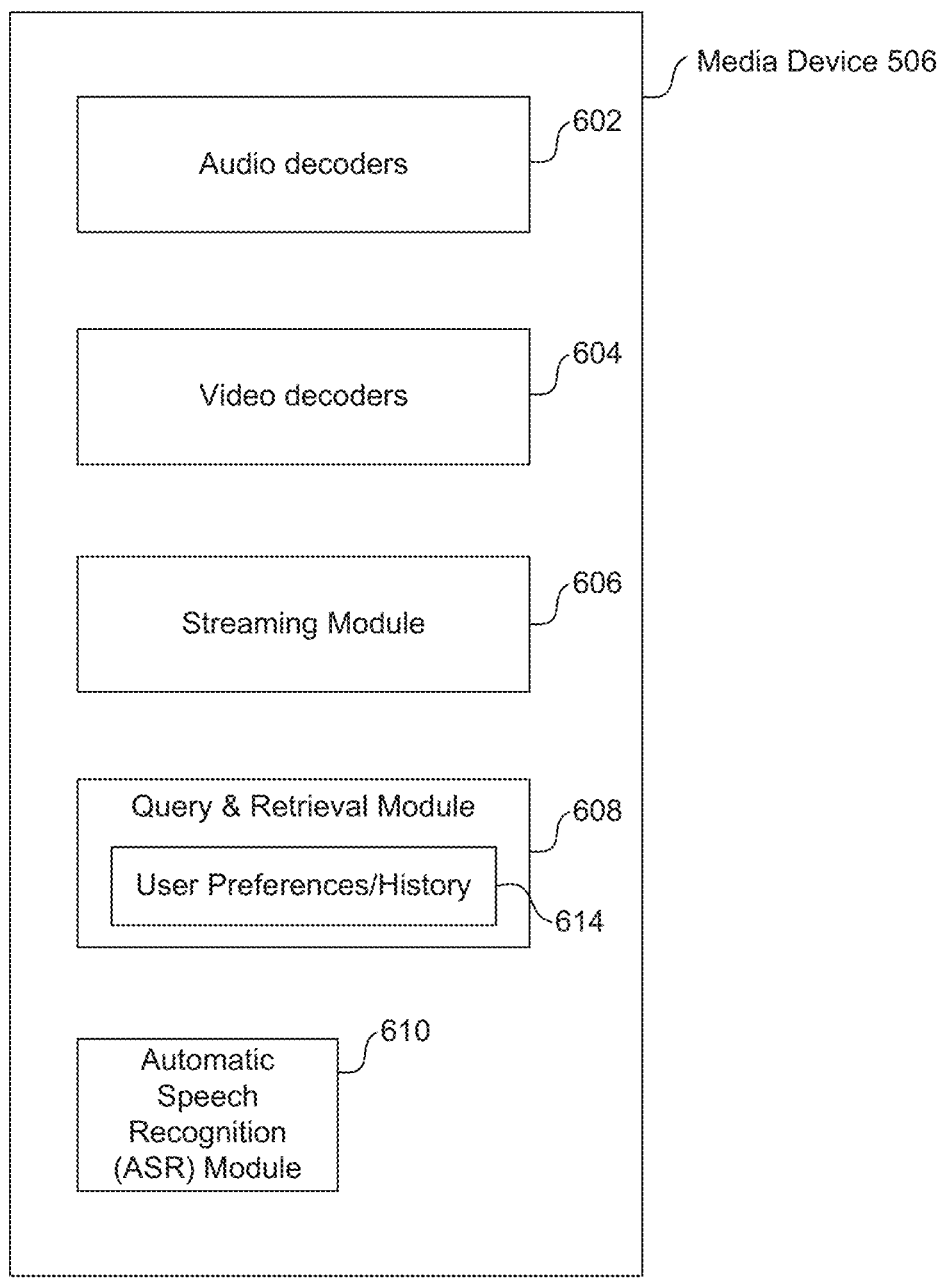
FIG. 6 illustrates a block diagram of a media device in the multimedia environment of FIG. 5, according to some embodiments.

FIG. 6 illustrates a block diagram of an example media device 506, according to some embodiments. Media device 506 may include one or more audio decoders 602 and one or more video decoders 604.

Each audio decoder 602 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 604 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

The media device 506 may also include a streaming module 606. The streaming module 606 may operate to obtain content 524 (that was requested by user 503) from a content source 522 via the network 518. The media device 506 may transmit the received content 524 to its associated display device 508 for presentation to the user 503 who requested the content 524.

The media device 506 may include a query & retrieval module 608. The query & retrieval module 608 may process text searches and voice searches for content received from users 503. The query & retrieval module 608 may store user preferences/history 614. Such user preferences/history 614 may include information that pertains to users 503 who use the media device 506, that was downloaded from the server 530 and/or obtained by the media device 506 while monitoring the action of users 503 while using the media device 506 to select and consume content 524. For example, the media device 506 may keep track of the viewing history of the user 503. The media device 506 may periodically upload the user preferences/history 614 to the server 530 for storage in the user preferences/history database 532.

The media device 506 may include an automated speech recognition (ASR) module 610. The ASR module 610 may use any well-known ASR hardware, part, apparatus, method, approach, and/or technology to recognize audible voice input spoken by users 503 and received by the microphone 514 of the remote control 510 (it is noted that this voice input could alternatively be received in other ways, such as via a microphone—not shown—in the media device 506).

Figure 7:
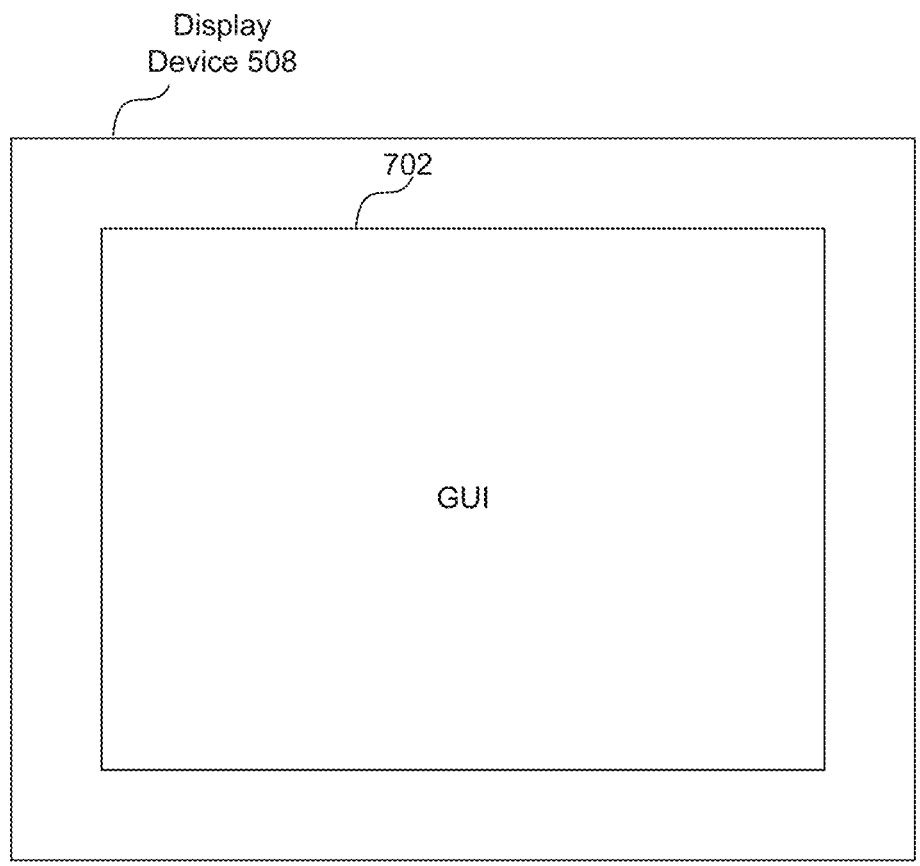
FIG. 7 illustrates a block diagram of a display device in the multimedia environment of FIG. 5, according to some embodiments.

FIG. 7 illustrates an example display device 508. The display device 508 may display a graphical user interface (GUI) 702. Example GUIs 702 are described below.

Figure 1:
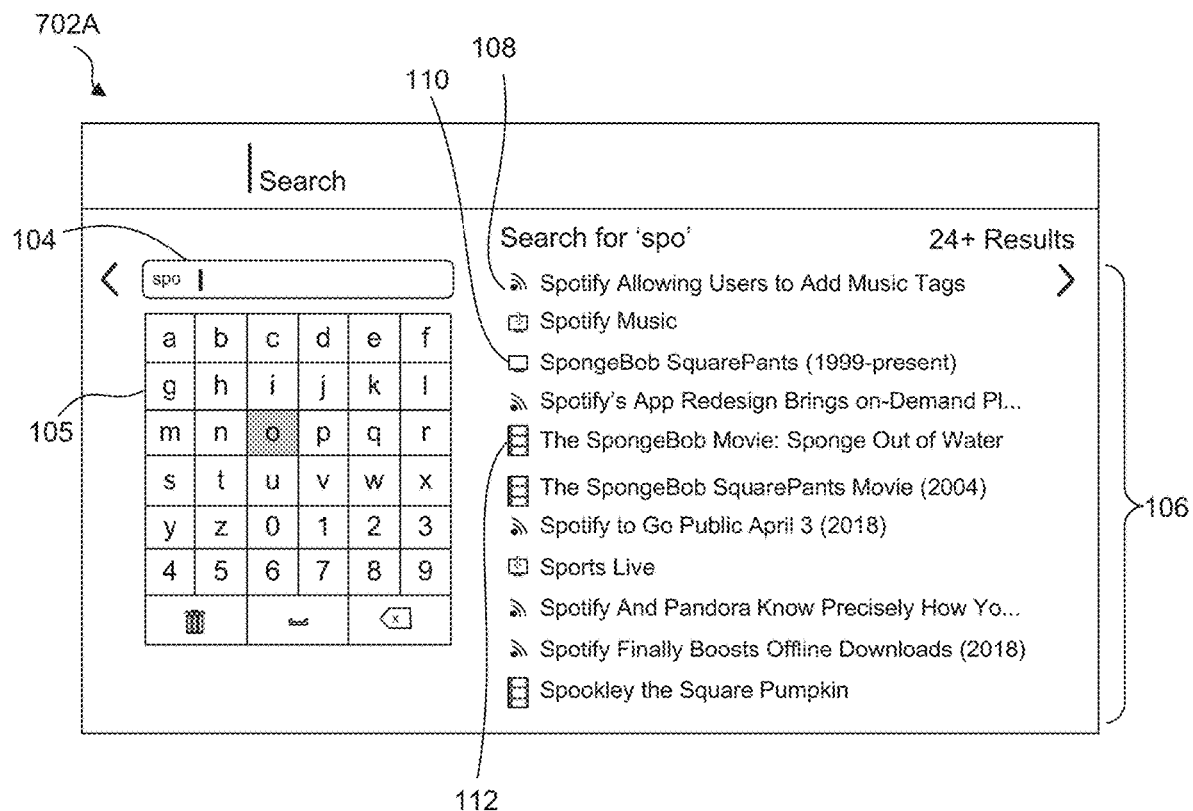
FIG. 1 illustrates an example user interface showing search results presented in a list, according to some embodiments.

For example, FIG. 1 illustrates an example user interface 702A where user 503 has entered a text search 104 of "spo". The user 503 may have entered this text search 104 using an on-screen keypad 105 or the remote control 510. In the example of FIG. 1, the search results 106 are displayed in a list format. But displaying search results 106 in a list may not be helpful. This is particularly true when the list is long and/or the search results 106 include different types of content, such as movies, TV shows, music, apps, etc., which is the case in FIG. 1. The example user interface 702A may attempt to rectify this problem by using icons 108 to indicate the type of the content. For example, a TV icon 110 may be used to indicate a TV show, and a film icon 112 may be used to indicate a movie. But such icons may be hard for the user 101 to see much less discern, and may exacerbate the busyness of the list.

Figure 2:
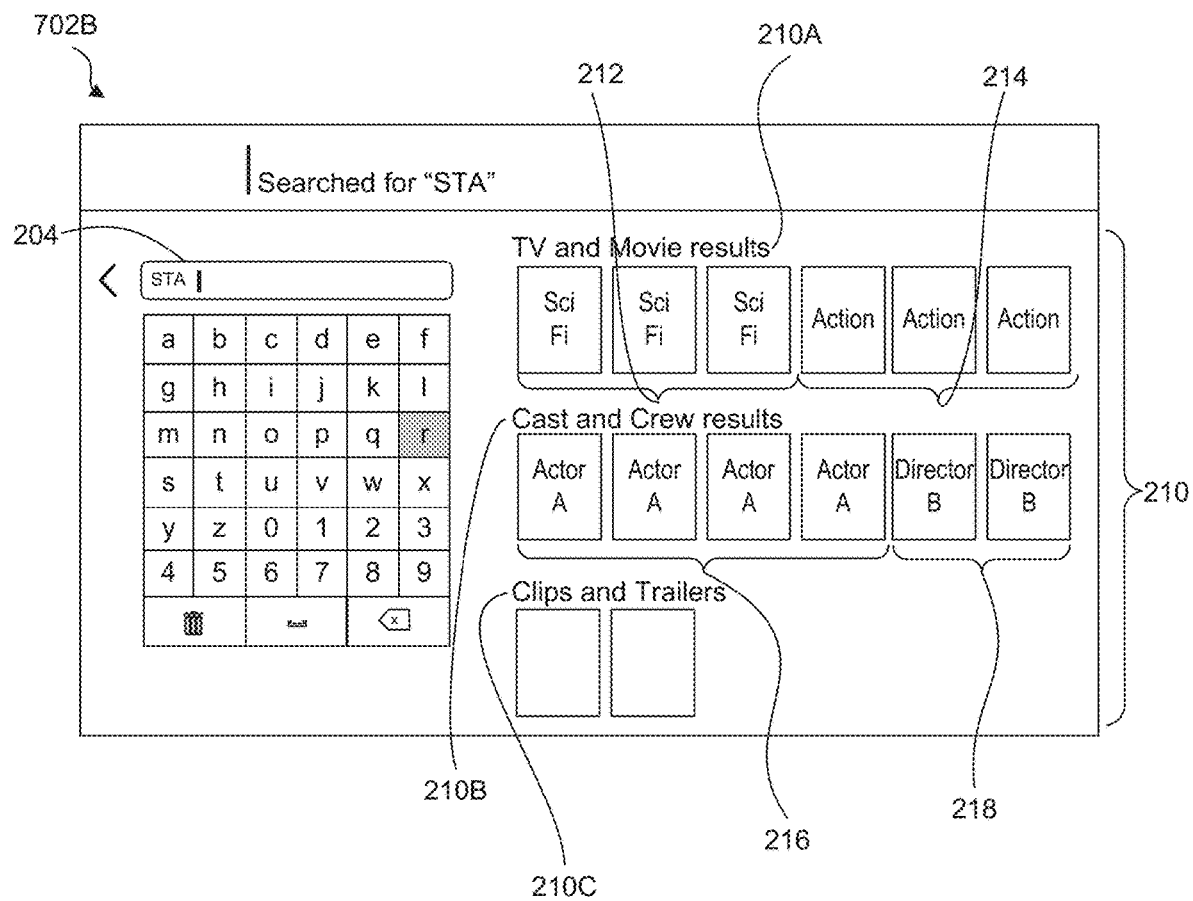
FIG. 2 illustrates an example user interface showing search results organized and presented in categories, according to some embodiments.

FIG. 2 illustrates an alternative example user interface 702B where the user 503 has entered a text search 204 of "sta", according to some embodiments. The user interface 702B in FIG. 2 is an improvement on the user interface 702A of FIG. 1. For example, in user interface 702B of FIG. 2, the search results are organized into categories 210, such as TV and movie results 210A, cast and crew results 210B, clips and trailers 210C, etc. Using categories 210 makes it much easier for the user 503 to navigate through and find content of interest.

Also, in some embodiments, items in a given category 210 are ordered in a manner customized to the user 503 who initiated the search. For example, it may be known from the user 503's preferences and/or history 614 that the user 503 prefers science fiction movies the most, followed by action movies. Accordingly, the TV and movie results category 210A may be ordered such that science fiction movies 212 are listed first, followed by action movies 214.

Similarly, it may be known from the user 503's preferences and/or history 614 that the user 503 likes Actor A and Director B. Accordingly, the cast and crew results 210B may be ordered such that works of Actor A 216 and Director B 218 are displayed before any others.

Also or alternatively, the categories 210 themselves may be ordered in a manner customized to the user 503 who initiated the search. For example, it may be known from the user 503's preferences and/or history 614 that the user 503: (1) watches TV shows and movies more than any other type of content; (2) often watches movies with certain actors or by certain directors; and (3) frequently watches clips and trailers of movies. Accordingly, the categories 210 may be selected and displayed in the user interface 702B so as to focus on the user 503's preferences, such that TV and movie results 210A, cast and crew results 210B, and clips and trailers 210C are displayed at the top of user interface 702B.

Figure 3:
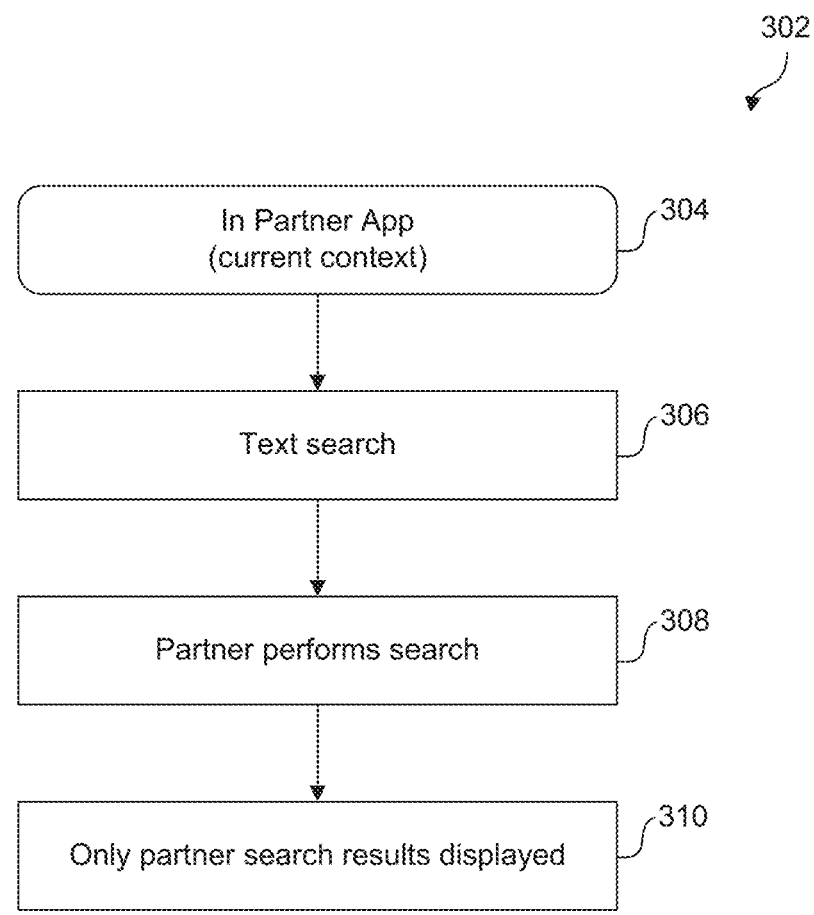
FIG. 3 illustrates a flowchart for performing a text search of a single content source, according to some embodiments.

FIG. 3 illustrates a flowchart of a method 302 for performing a text search of a single content source, according to some embodiments. For illustrative purposes, method 302 shall be described with reference to FIGS. 1 and 5.

In some embodiments, method 302 is performed while the user 503 is in the app (application) of a partner content source 522B or 522C while using the media device 506. This partner content source 522B or 522C may be said to represent the active partner content source 522B or 522C and/or the current (or active) context. This is indicated by 304.

In 306, the user 503 may enter a text search 104 using an on-screen keyboard 105 in GUI 702A, or the keypad 512 in remote control 510.

In 308, the active partner content source 522B or 522C may execute the text search 104. In some embodiments, the search is performed over only the active partner content source 522B or 522C's content 524B or 524C.

In 310, the search results may be displayed. In some embodiments, the search results contain only the active partner content source 522B or 522C's content 524B or 524C from the search conducted in 308. The search results may be displayed in a list 106, as shown in the example of FIG. 1.

Figure 4:
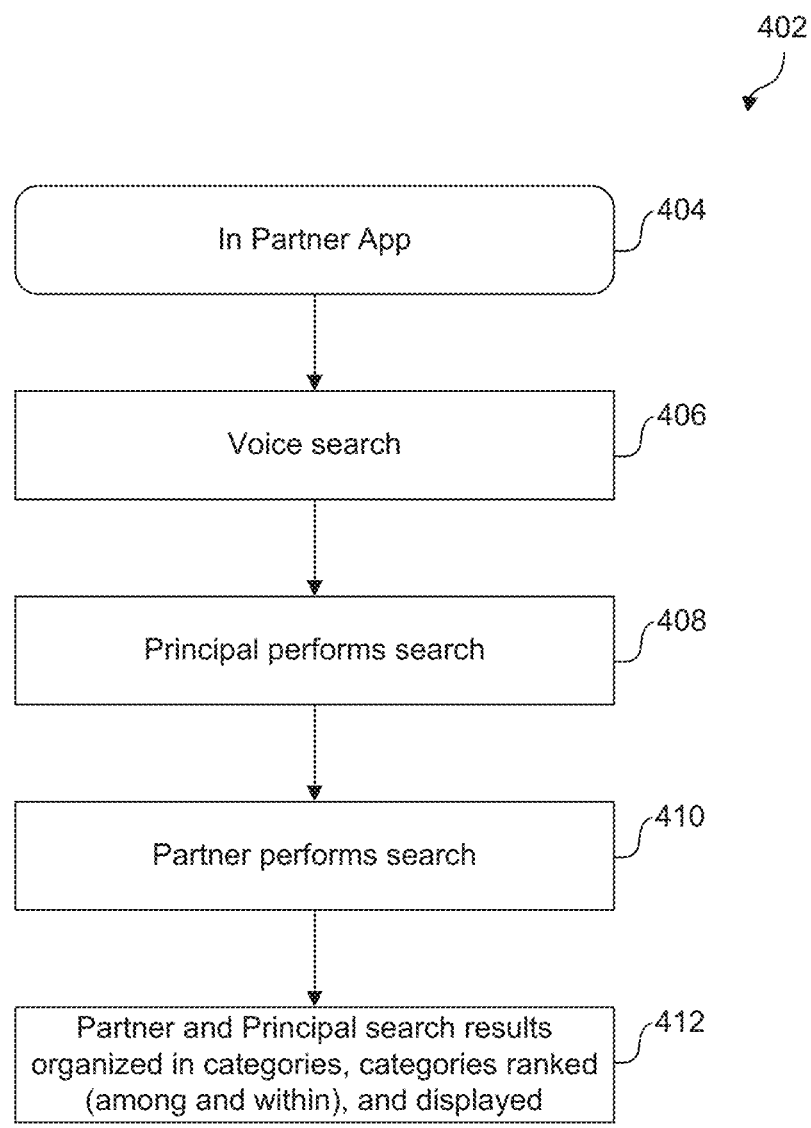
FIG. 4 illustrates a flowchart for performing a voice search of multiple content sources, according to some embodiments.

FIG. 4 illustrates a flowchart of a method 402 for performing a voice search of multiple content sources, according to some embodiments. Method 402 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 402 shall be described with reference to FIGS. 2 and 5. However, method 402 is not limited to those example embodiments.

In some embodiments, method 402 is performed while the user 503 is in the app of a partner content source 522B or 522C while using the media device 506. This is indicated by 404.

In 406, the user 503 speaks the parameters of a voice search, like "Find movies with Harrison Ford."

In 408, the principal content source 522A may search its content 524A according to the voice search parameters.

In 410, the active partner content source 522B or 522C as well as other partner content sources 522B, 522C may search their respective contents 524B, 524C according to the voice search parameters.

In 412, the search results from 408 and 410 may be displayed. The search results may be ordered and displayed in categories 210 in a GUI 702B as shown in FIG. 2.

As should be apparent to persons skilled in the relevant art(s), method 402 of FIG. 4 is an improvement over method 302 of FIG. 3. For example, method 402 is directed to a voice search over multiple content sources 522. In particular, the search is performed over content 524A of the principal content source 522A, content 524B or 524C of the active partner content source 522B or 522C, and content 524B, 524C of one or more other partner content sources 522B, 522C. Also, the search results are not displayed in a list (such as that shown in FIG. 1), but are instead displayed in categories 210 where the categories 210 are ordered (both within and among the categories 210), as described above with respect to FIG. 2. These and other advantages of method 402 shall become more apparent from discussion of FIG. 10.

Figure 9:
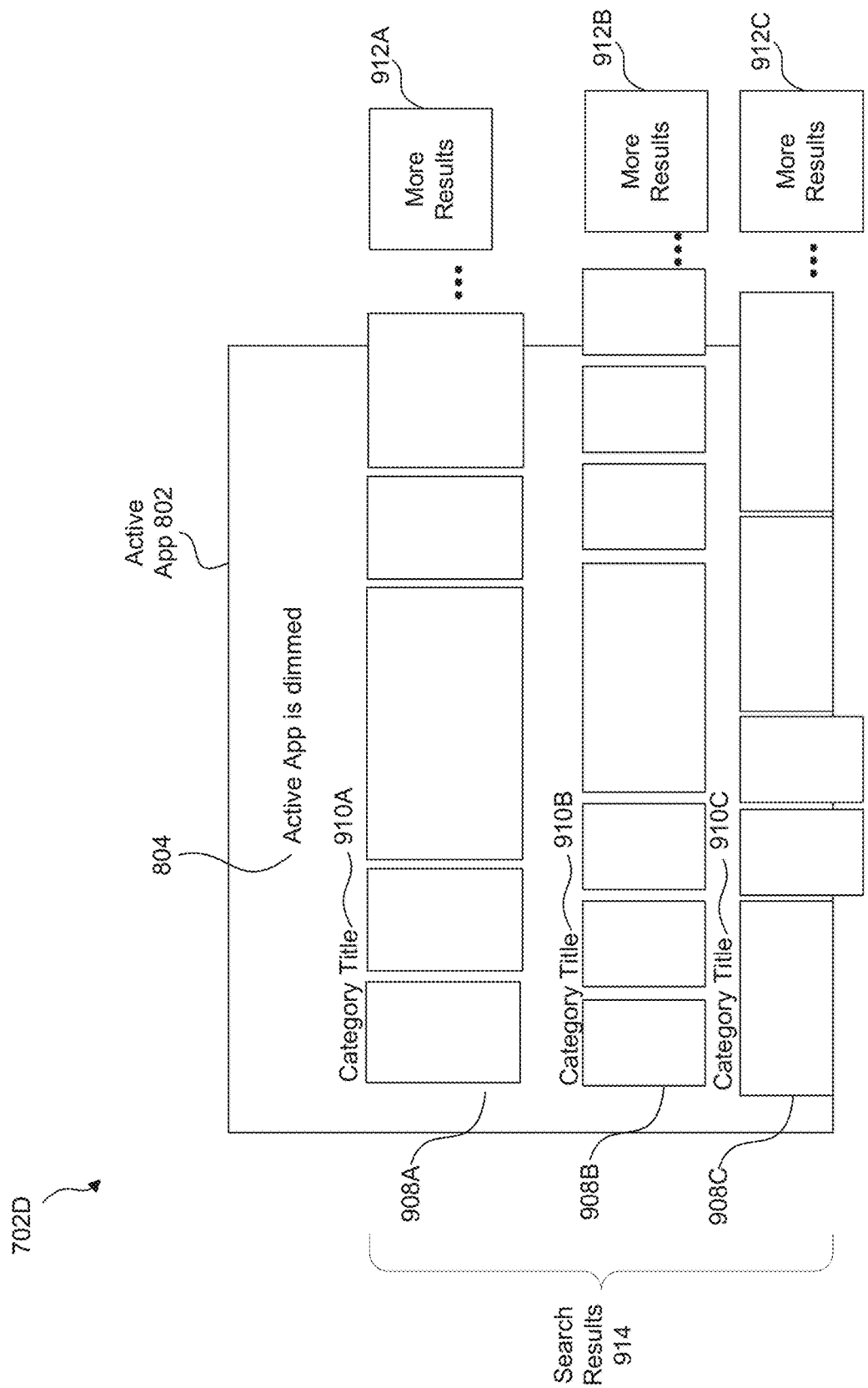
Figure 10:
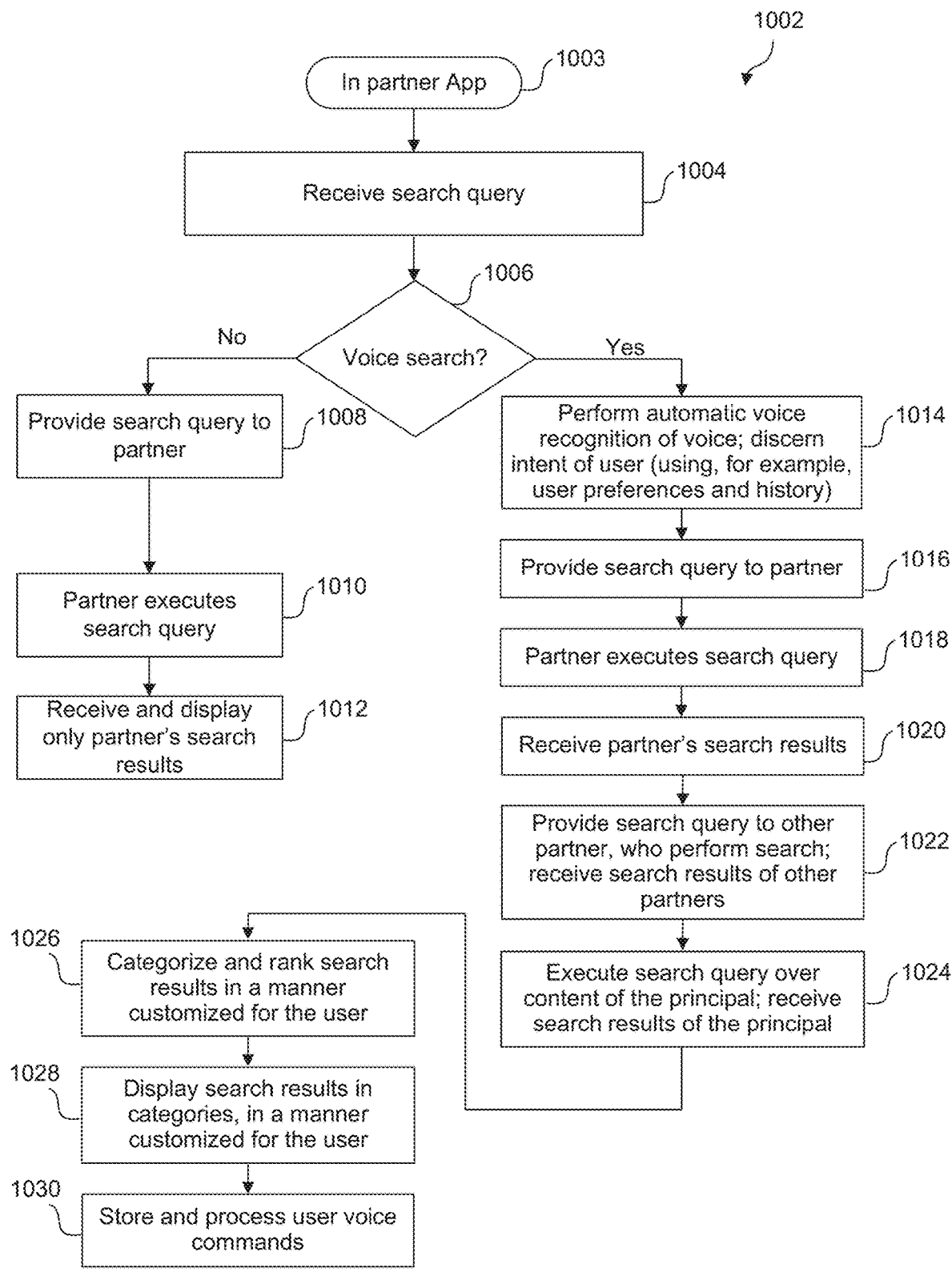
FIG. 10 illustrates a flowchart for performing a voice search of multiple content sources, and displaying the search results using the user interfaces of FIGS. 8 and 9, according to some embodiments.

FIG. 10 illustrates a flowchart of a method 1002 for performing a voice search of multiple content sources. Method 1002 may be considered a more detailed version of method 402 of FIG. 10. Method 1002 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art. Method 1002 shall be described with reference to FIGS. 5, 6, 8 and 9. However, method 1002 is not limited to those example embodiments.

In some embodiments, method 1002 is performed while the user 503 is in the app of a partner content source 522B or 522C (herein called the active partner content source 522B or 522C) while using the media device 506. This is indicated by 1003.

Throughout method 1002, the media device 506 may represent and be associated with the principal content source 522A.

In 1004, the media device 506 may receive a search query from user 503. The search query may be a text search that the user 503 entered using the keypad 512 of remote control 510, or an on-screen keypad of a GUI (such as that shown in FIGS. 1 and 2). The remote control 510 may transmit the text entered by the user 503 to the media device 506 via any well-known means (such as via an infrared connection, for example).

Alternatively, the search may be a voice search. In this latter case, the user 503 may indicate a desire to provide a voice search by pressing the voice button 516 of the remote control 510. Upon detecting that the voice button 516 has been pressed, the remote control 510 may listen for audible voice input from the user 503 by using the microphone 514. The remote control 510 may transmit the voice data received via the microphone 514 to the media device 506 via any well-known means (such as via an infrared connection, for example).

As indicated by 1006, if the user 503 provided a voice search in 1004, then 1014 is performed. Otherwise, 1008 is performed.

Consider first the case where the user 503 did not provide a voice search in 1004. That is, the user 503 provided a text search in 1004. In that case, in 1008, the media device 506 may transmit the text search to the active partner content source 522B or 522C via the network 518.

In 1010, the active partner content source 522B or 522C may execute the text search over its content 524B or 524C. It is noted that, in some embodiments, only the content 524B or 524C of the active partner content source 522B or 522C is searched in 1010.

In 1012, the active partner content source 522B or 522C may transmit the search results from 1010 to the media device 506. The media device 506 may cause the search results to be displayed on the display device 508. Example GUIs 702A or 702B in FIGS. 1 and 2 may be used to display the search results. In some embodiments, the search results are displayed while the user 503 remains in the app of the active partner content source 522B or 522C. That is, there is no context change when the search is performed (in 1010) and the search results are displayed (in 1012).

Referring back to 1006, if the user 503 provided a voice search in 1004, then 1014 is performed.

In 1014, the ASR module 610 in the media device 506 may perform automatic voice recognition of the voice data received in 1004, in order to recognize and convert the voice search to a textual search query and parameters. As noted above, throughout method 1002, the media device 506 may represent and be associated with the principal content source 522A. The ASR module 610 may use any well-known ASR hardware, part, apparatus, method, approach, and/or technology to perform this function.

As part of 1014, the ASR module 610 may analyze the voice search to determine the intent of the user 503, using the user 503's preferences and history 614. For example, if the user 503's preferences and history 614 indicate that the user 503 often watches movie trailers but rarely watches TV show trailers, then if the voice search was "find trailers with Tom Hanks," the query & retrieval module 608 (working with the ASR module 610) may conclude that the user 503's intent was to find trailers of movies with Tom Hanks, rather than trailers of TV shows with Tom Hanks.

In 1016, the media device 506 may transmit the converted voice search (that has been converted to a textual search query) to the active partner content source 522B or 522C via the network 518.

In 1018, the active partner content source 522B or 522C may execute the voice search over its content 524B or 524C. The active partner content source 522B or 522C may transmit its search results to the media device 506 via the network 518.

In 1020, the media device 506 may receive the search results from the active partner content source 522B or 522C.

In 1022, the media device 506 may transmit the converted voice search to other partner content sources 522B, 522C. These other partner content sources 522B, 522C may execute the voice search over their respective contents 524B, 524C, and may transmit their search results to the media device 506 via the network 518.

In 1024, the media device 506 may execute the converted voice search over its own content. That is, the media device 506 may transmit the converted voice search to the principal content source 522A via the network 518. The principal content source 522A may perform the voice search over its content 524A, and then transmit the search results to the media device 506 over the network 518.

In 1026, the query & retrieval module 608 of the media device 506 may categorize and rank the search results from the principal and partner content sources 522 (that is, from steps 1018, 1022 and 1024) in a manner customized to the user 503 who initiated the voice search in 1004. For example, the query & retrieval module 608 may select categories based on the user 503's preferences and viewing history 614. For example, the query & retrieval module 608 may select "live action sports" and "news" as categories if the user 503's preferences and viewing history 614 indicates he regularly watches such content.

The query & retrieval module 608 may also generate new categories based on the user 503's preferences and viewing history 614. For example, suppose the user 503 has recently watched news about Brexit from sources outside the UK. In this case, the query & retrieval module 608 may generate a "non-UK Brexit news" category specifically for the user 503.

Also in 1026, the query & retrieval module 608 may order the items in each category according to the user 503's preferences and viewing history 614, as described above.

In some embodiments, in 1026, the query & retrieval module 608 may categorize and order the search results from the active partner content source 522B or 522C separate from the search results from the principal content source 522A and the other non-active partner content sources 522B, 522. In this way, the media device 506 can display these categories separately in the display device 508; this is further described below.

Figure 8:
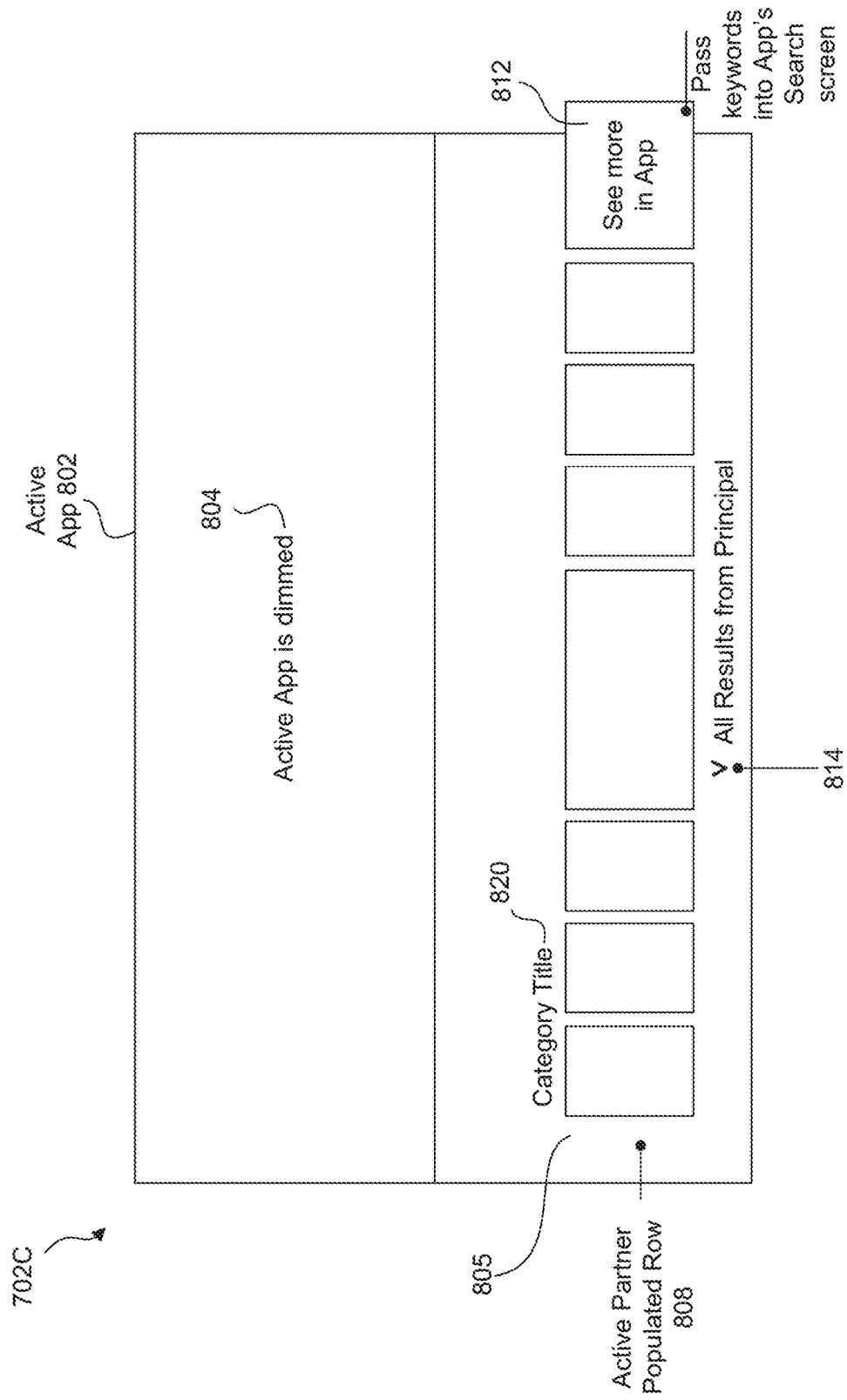
FIGS. 8 and 9 illustrate example user interfaces showing search results of multiple content sources organized and presented in categories, according to some embodiments.

In 1028, the media device 506 may display the search results in the categories of 1026, in a manner customized to the user 503 who initiated the voice search in 1004. The search results may be displayed in GUIs 702 on the display device 508. FIGS. 8 and 9 illustrate example GUIs 702 that may be used in 1028.

FIG. 8 illustrates a GUI 702C wherein the active app 802 (that is, the app corresponding to the active partner content source 522B or 522C) may be displayed, Search results 805 may be displayed over the active app 802, and while this is done, the active app 802 may be dimmed (as indicated by 804).

The search results 805 may include one or more rows 808 of the search results returned by the active partner content source in 1020. Each row 808 may represent a category, and the categories may be ordered (both within and among the categories) in a manner customized to the user 503, as described herein. The names of the categories may be displayed as 820.

If the user 503 wishes to see more search results of the active partner content source 522B or 522C, then the user 503 can select or scroll pass tile 812. If this occurs, then the voice search is transmitted to the active partner content source 522B or 522C to perform additional searching of its content 524B or 524C (similar to the operation of 1016-1020).

If the user 503 wishes to see search results of other content sources 522, then the user can press a down icon 814, or scroll down. Upon taking this action, a GUI 702D shown in FIG. 9 may be displayed.

In GUI 702D, the active app 802 may still be displayed, but dimmed (as again indicated by 804). Search results 914 may be displayed over the active app 802. The search results 914 may be displayed in rows 908, with each row 908 corresponding to a category from step 1026. Some of the rows 908 may correspond to search results of the principal content source 522A, and others may correspond to search results of non-active partner content sources 522B, 522C, where the rows 908 (that is, categories) may be ordered (both within and among the categories) in a manner customized to the user 503, as described herein. The names of the categories may be displayed as 910. More search results can be obtained by selecting or scrolling pass the tiles 912.

As will be apparent to persons skilled in the relevant art(s), method 1002 is an improvement over prior approaches because voice searches can be executed over multiple content sources 522. The automatic speech recognition (ASR) function is centralized with and performed by the principal content source 522A (that is, the media device 506 associated with the principal content source 522A); thus, the partner content sources 522B, 522C are not required to develop or implement their own ASR solutions, thereby saving on computing resources, and enabling the processing of voice searches to be consistent across content sources 522. Also, because the principal content source 522A controls the ASR process, the principal content source 522A has access to all the voice input from users 503. The principal content source 522A can process and store such voice input to enhance the user preferences and history 614 and for other processing and advantages, as indicated by 1030.

Method 1002 is further improved over prior approaches because it does not change contexts when performing searches over multiple content sources 522. Instead, the voice search processing of steps 1014-1030 are performed by the media device 506 while remaining in the context of the active partner content source 522B or 522C (that is, the active app 802). Accordingly, method 1002 does not require disruptive context switches for its processing.

Example Computer System

Figure 11:
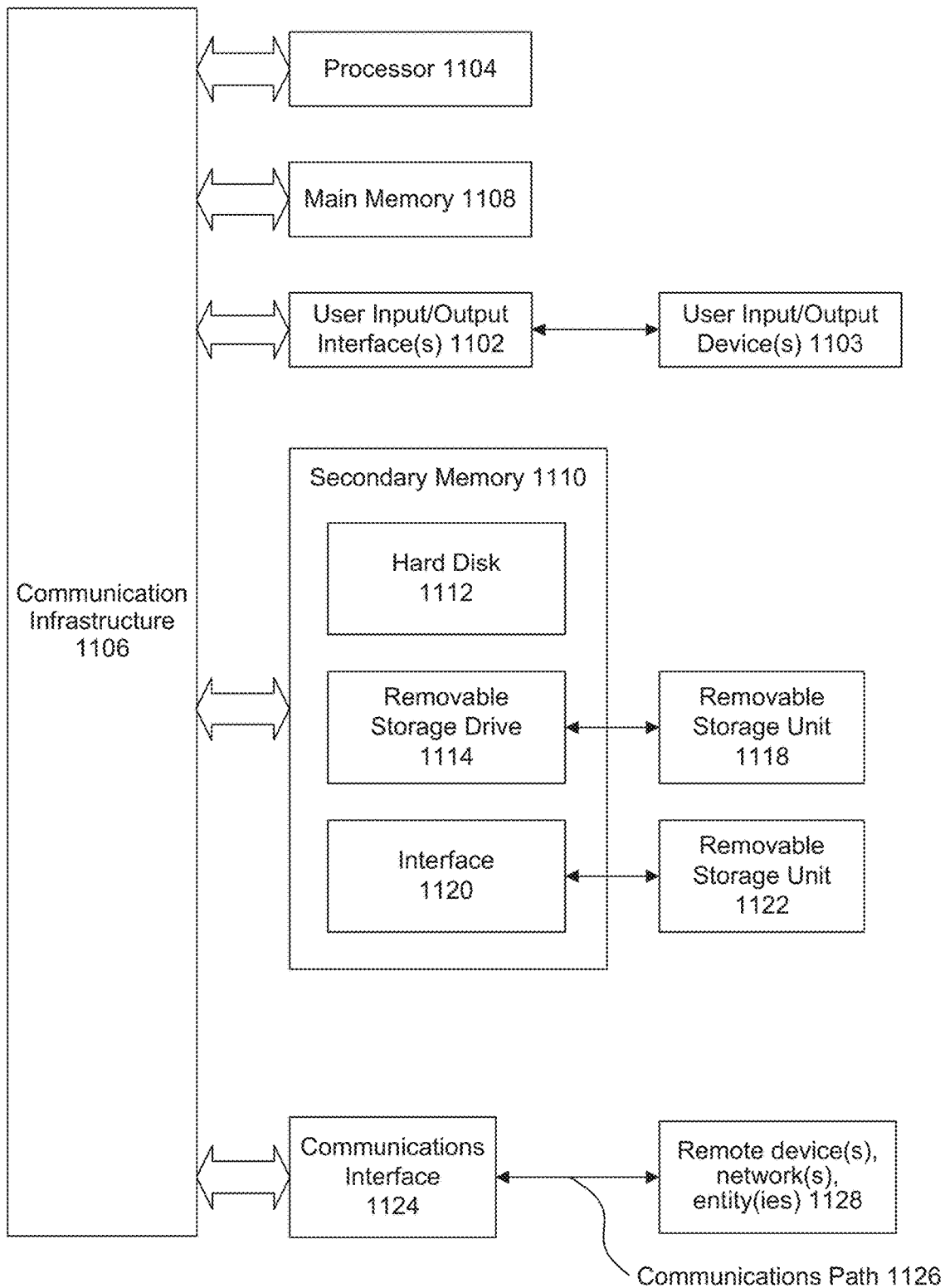
FIG. 11 illustrates an example computer system useful for implementing various embodiments.

Various embodiments and/or components therein can be implemented, for example, using one or more computer systems, such as computer system 1100 shown in FIG. 11. Computer system 1100 can be any computer or computing device capable of performing the functions described herein. For example, one or more computer systems 1100 or portions thereof can be used to implement any embodiments of FIGS. 1-10, and/or any combination or sub-combination thereof.

Computer system 1100 includes one or more processors (also called central processing units, or CPUs), such as a processor 1104. Processor 1104 is connected to a communication infrastructure or bus 1106.

One or more processors 1104 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 can include one or more levels of cache. Main memory 1108 has stored therein control logic (i.e., computer software) and/or data.

Computer system 1100 can also include one or more secondary storage devices or memory 1110. Secondary memory 1110 can include, for example, a hard disk drive 1112 and/or a removable storage device or drive 1114. Removable storage drive 1114 can be a floppy disk drive, a magnetic tape drive, a compact disk drive, an optical storage device, tape backup device, and/or any other storage device/ drive.

Removable storage drive 1114 can interact with a removable storage unit 1118. Removable storage unit 1118 includes a computer usable or readable storage device having stored thereon computer software (control logic) and/or data. Removable storage unit 1118 can be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 can include other means, instrumentalities or other approaches for allowing computer programs and/or other instructions and/or data to be accessed by computer system 1100. Such means, instrumentalities or other approaches can include, for example, a removable storage unit 1122 and an interface 1120. Examples of the removable storage unit 1122 and the interface 1120 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 can further include a communication or network interface 1124. Communication interface 1124 enables computer system 1100 to communicate and interact with any combination of remote devices, remote networks, remote entities, etc. (individually and collectively referenced by reference number 1128), For example, communication interface 1124 can allow computer system 1100 to communicate with remote devices 1128 over communications path 1126, which can be wired and/or wireless, and which can include any combination of LANs, WANs, the Internet, etc. Control logic and/or data can be transmitted to and from computer system 1100 via communication path 1126.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

Conclusion

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

receiving input corresponding to a search from a user;

identifying search parameters from the input;

executing a search having the search parameters over multiple types of content to obtain search results, wherein the types of content include different multimedia formats corresponding to how the content is consumed;

sorting the search results based on the types of content;

identifying a content history for the user identifying which of the types of content the user consumed;

determining a set of one or more preconfigured categories that are independent of the content history for the user;

generating a new category based on the content history for the user;

arranging the sorted search results based on the content history for the user so as to identify which of the types of content the user consumed, wherein the arranged and sorted search results provide search results associated with a first type of content prior to search results associated with a second type of content, and wherein the first type of content was consumed by the user more than the second type of content as indicated by the content history for the user; and displaying the arranged and sorted search results in a manner customized to the user based on both the set of one or more preconfigured categories that are independent of the content history for the user and the new category generated based on the content history for the user.

2. The method of claim 1, wherein the receiving comprises:

receiving an indication that the user pressed a voice button on a remote control; and monitoring a microphone in the remote control to receive audio input, wherein the identifying is performed based on the audio input.

3. The method of claim 1, wherein active content is displayed when the input is received, and wherein the executing and displaying are performed without exiting the active content.

4. The method of claim 1, wherein the displaying comprises:

displaying the search results associated with the first type of content separately and above the search results associated with the second type of content.

5. The method of claim 1, wherein one of the types of content include a first identified person associated with a first particular role in creating one of the types of content, and another one of the types of content include a second person associated with a second particular role in creating the one of the types of content.

6. The method of claim 1, wherein at least one of the types of content is organized based on categories of the at least one of the types of content as indicated by the content history for the user.

7. The method of claim 1, wherein the arranging comprises ordering the search results based on user preferences for the one or more preconfigured categories and the new category.

8. A non-transitory computer-readable medium having instructions stored thereon that, when executed by at least one computing device, cause the at least one computing device to perform operations comprising:

receiving input corresponding to a search from a user;

identifying search parameters from the input;

executing a search having the search parameters over multiple types of content to obtain search results, wherein the types of content include different multimedia formats corresponding to how the content is consumed;

sorting the search results based on the types of content;

identifying a content history for the user identifying which of the types of content the user consumed;

determining a set of one or more preconfigured categories that are independent of the content history for the user;

generating a new category based on the content history for the user;

arranging the sorted search results based on the content history for the user so as to identify which of the types of content the user consumed, wherein the arranged and sorted search results provide search results associated with a first type of content prior to search results associated with a second type of content, and wherein the first type of content was consumed by the user more than the second type of content as indicated by the content history for the user; and displaying the arranged and sorted search results in a manner customized to the user based on both the set of one or more preconfigured categories that are independent of the content history for the user and the new category generated based on the content history for the user.

9. The non-transitory computer-readable medium of claim 8, wherein the receiving comprises:

receiving an indication that the user pressed a voice button on a remote control; and monitoring a microphone in the remote control to receive audio input, wherein the identifying is performed based on the audio input.

10. The non-transitory computer-readable medium of claim 8, wherein active content is displayed when the input is received, and wherein the executing and displaying are performed without exiting the active content.

11. The non-transitory computer-readable medium of claim 8, wherein the displaying comprises:

displaying the search results associated with the first type of content separately and above the search results associated with the second type of content.

12. The non-transitory computer-readable medium of claim 8, wherein one of the types of content include a first identified person associated with a first particular role in creating content, and another one of the types of content include a second person associated with a second particular role in creating content.

13. The non-transitory computer-readable medium of claim 8, wherein at least one of the types of content is organized based on categories of the at least one of the types of content as indicated by the content history for the user.

14. An apparatus, comprising:

a memory; and at least one processor coupled to the memory and configured to perform operations comprising:

receiving input corresponding to a search from a user;

identifying search parameters from the input;

executing a search having the search parameters over multiple types of content to obtain search results, wherein the types of content include different multimedia formats corresponding to how the content is consumed;

sorting the search results based on the types of content;

identifying a content history for the user identifying which of the types of content the user consumed;

determining a set of one or more preconfigured categories that are independent of the content history for the user;

generating a new category based on the content history for the user;

arranging the sorted search results based on the content history for the user so as to identify which of the types of content the user consumed, wherein the arranged and sorted search results provide search results associated with a first type of content prior to search results associated with a second type of content, and wherein the first type of content was consumed by the user more than the second type of content as indicated by the content history for the user; and displaying the arranged and sorted search results in a manner customized to the user based on both the set of one or more preconfigured categories that are independent of the content history for the user and the new category generated based on the content history for the user.

15. The apparatus of claim 14, wherein the receiving comprises:
   receiving an indication that the user pressed a voice button on a remote control; and
   monitoring a microphone in the remote control to receive audio input, wherein the identifying is performed based on the audio input.

16. The apparatus of claim 14, wherein active content is displayed when the input is received, and wherein the executing and displaying are performed without exiting the active content.

17. The apparatus of claim 14, wherein the receiving comprises:
   displaying the search results associated with the first type of content separately and above the search results associated with the second type of content.

18. The apparatus of claim 14, wherein one of the types of content include a first identified person associated with a first particular role in creating one of the types of content, and another one of the types of content include a second person associated with a second particular role in creating the one of the types of content.

* * * * *